Oct. 8, 1935.   J. R. CARROLL   2,016,275
RIGGING INSTRUMENT
Filed Sept. 25, 1931   2 Sheets-Sheet 1
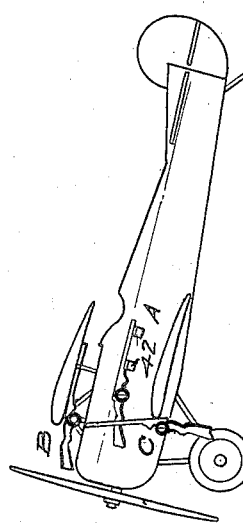
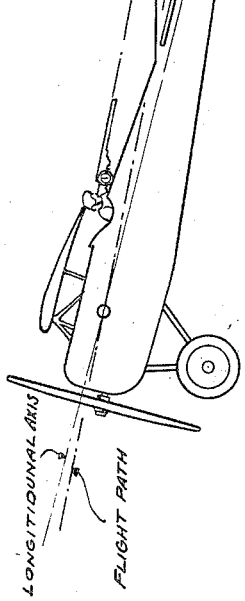
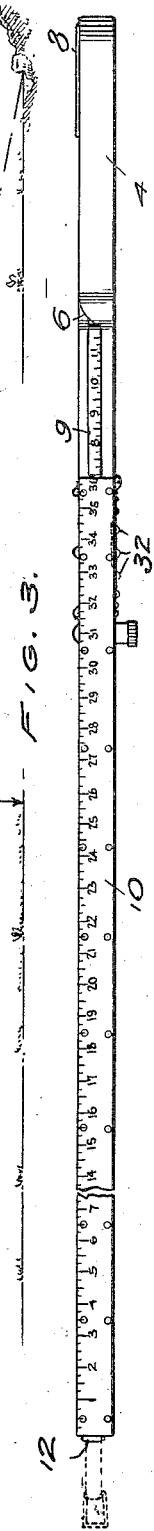
INVENTOR
JOHN R. CARROLL
BY Robert H. Young
ATTORNEY Oct. 8, 1935.  J. R. CARROLL  2,016,275
RIGGING INSTRUMENT
Filed Sept. 25, 1931   2 Sheets-Sheet 2
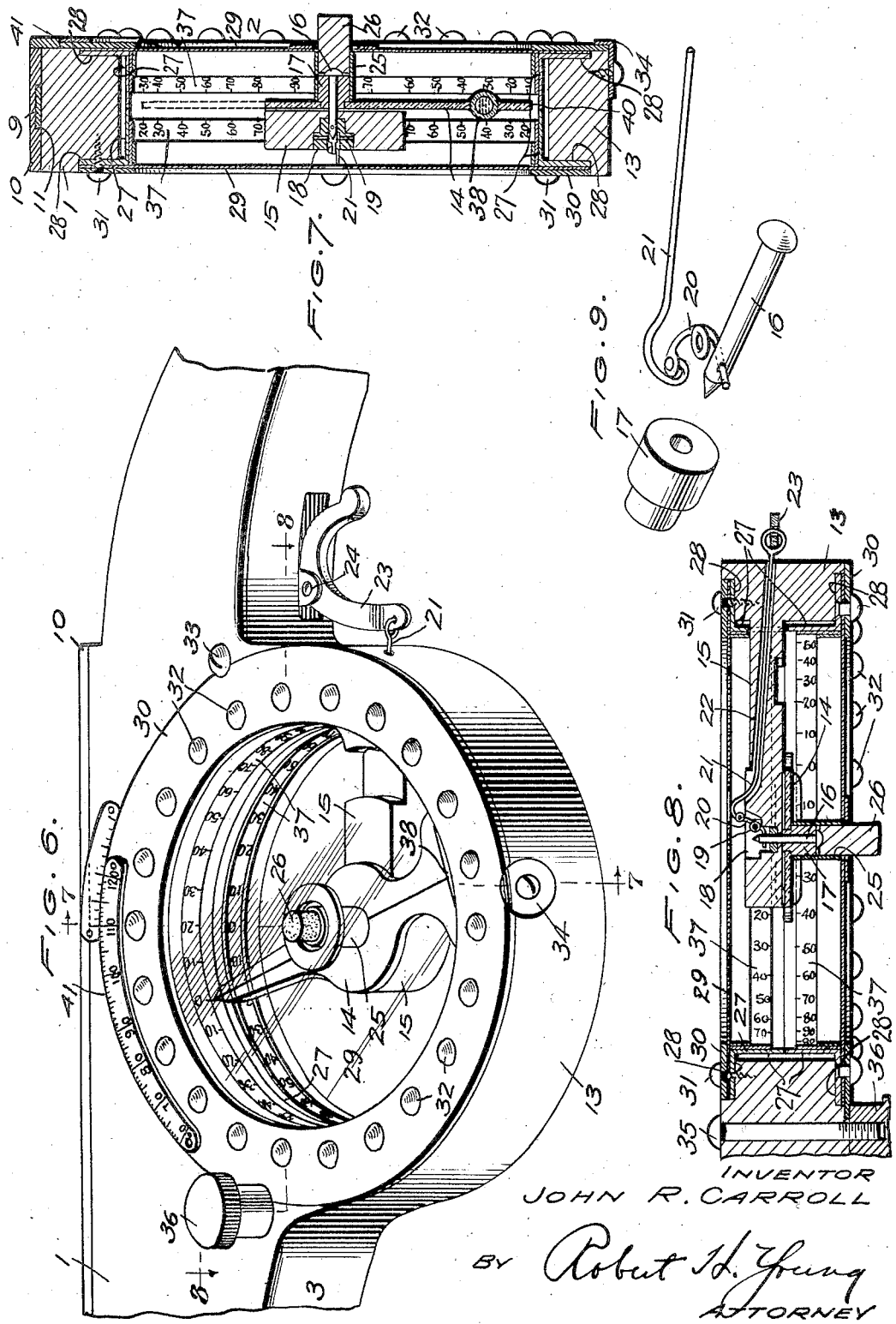
INVENTOR
JOHN R. CARROLL
BY Robert H. Young
ATTORNEY Patented Oct. 8, 1935

2,016,275

UNITED STATES PATENT OFFICE 2,016,275

RIGGING INSTRUMENT

John R. Carroll, Urbana, Ill.

Application September 25, 1931, Serial No. 565,021

17 Claims. (Cl. 33—73)

(Granted under the act of March 3, 1883, as amended April 30, 1928; 370 O. G. 757)

The invention described herein may be manufactured and used by or for the Government for govermental purposes, without the payment to me of any royalty thereon.

This invention relates to a rigging instrument to be used in aligning an aeroplane and in "trouble shooting" its performance.

In the operation of rigging, i. e. in the assembling and truing up of the component units and in the aligning of the composite assembly of an airplane, a plurality of measuring instruments are required for performing separate and distinct operations, such as checking angles, leveling parts, and measuring distances, etc. During the process of rigging an airplane these instruments are invariably scattered and much time is frequently expended by a mechanic endeavoring to locate a particular instrument which may have become misplaced or lost. Furthermore these several instruments thus scattered about are subject to accidental injury to themselves and to the surfaces of the airplane. From this, together with the fact that it is impractical, with present equipment, to instrument align or to instrument check an airplane without first leveling it into flying position, it is apparent that serious delays often occur in conditioning a plane for service.

With the foregoing in view, the invention has for an object the provision of an instrument having in combination the several measuring devices employed by the rigger and essential in the aligning of an airplane to precision, such as the protractor, straight-edge, steel tape and yard stick.

Further objects and advantages of the invention are to provide:

First an instrument with which any attitude of an airplane at rest on the ground may be taken as the "level" attitude, thus making it practical to instrument align or to instrument check an airplane without leveling it into flying position.

Second, an instrument by means of which the attitude of balance of an airplane in flight may be definitely established, thus eliminating the vagueness of "left wing low", etc.

Third, an instrument by means of which the inclination of the flight path of an airplane to the horizontal may be checked, thus gaining information of value in "trouble shooting" the performance of that airplane.

Fourth, an instrument by means of which the inclination to the horizontal of the flight path of an airplane may be checked quickly and without actually applying the instrument on the airplane.

Fifth, an instrument having the design or formation of a gun or rifle for convenience in handling and accuracy in sighting for alignment.

These objects are attained by the novel construction and combination of parts hereinafter described, and shown in the accompanying drawings, wherein:

Fig. 1 is a view illustrating the application of the invention to an airplane in flight.

Fig. 2 is a view illustrating the application of the invention to an airplane, the tail of which is resting on the ground.

Fig. 3 is a top plane view of the rigging instrument.

Fig. 4 is a view of one side of the instrument.

Fig. 5 is a view of the opposite side of the instrument.

Fig. 6 is a detail view on an enlarged scale and in perspective of the plum-bob-protractor unit.

Fig. 7 is a sectional view on line 7—7 of Fig. 6.

Fig. 8 is a sectional view on line 8—8 of Fig. 6, and

Fig. 9 is a detail of the trigger mechanism.

The invention embodies a stock of rifle-like formation and preferably rectangular in cross section with the barrel 1 formed as a straight-edge. An object and advantage of the rifle stock formation is to enable the rigger to comfortably hold the instrument in relative alignment to two points spaced farther apart than the length of the straight edge of the instrument. A small spirit level 2 is mounted in the underside of the barrel adjacent one edge and forwardly of the hand-rest 3.

The shoulder piece 4 is recessed on one side to provide a line-holding pocket 5 and a guide groove or slot 6 leading from the pocket to the top side of the barrel or straight edge 1. Confined within the pocket 5 by means of the retaining ring 7, is a flexible steel tape unit 8 of the automatic re-wind type and including a tape line 9 having a portion unwound from the tape reel and extending through the guide slot 6 and along the top of the stock between the rifle barrel 1 and a yard stick 10 surmounting the barrel. Either one or both of the inner adjacent faces of the yard stick and barrel may be grooved, as at 11, Fig. 7 to provide a guide box for the tape line 9, the outer end of which is prevented from being entirely drawn into the box by the tape ring 12. The yard stick is used in measuring distances within the lengths of the barrel 1 and for measuring greater distances, the tape line 9 is extended beyond the yard stick to provide a prolongation of the latter, the graduation of the tape being read in connection with the graduation of the yard stick.

Depending from the underside of the rifle stock and forwardly of the shoulder piece is an enlargement 13 having a circular opening in which are housed various elements of a plumb-bob-protractor unit. Each side of the opening is closed by a transparent window to form a chamber or housing for the plumb-bob 14. An arm 15, integral with the stock, extends into the opening and has a transverse bore through which extends a headed needle 16 upon the headed end of which is rotatably supported a bearing block 17 (preferably an agate bearing) which carries the plumb-bob. The hole in the bearing block is considerably over-sized for the needle and the actual bearing surface between the needle and the bearing block is but a thin line with the result that the friction of rotation is reduced to a minimum.

By making the hole in the agate bearing of the plumb-bob or pendulum considerably larger than the pivot-needle which supports the pendulum, the latter is free to move laterally, i. e., transversely, of as well as around its pivot whereby it is permitted to hang vertically even though the base of the instrument is not in the horizontal plane. It is of the utmost importance that the pendulum be sensitive even though the pivot is inclined slightly to the horizontal. To illustrate—in checking the incidence of a wing, as hereinafter explained, the instrument is held up against the bottom of a wing rib and if the wing has dihedral the base of the instrument, and consequently the pivot of the pendulum, is not in a horizontal plane.

Mounted on the stock of the instrument is a trigger mechanism for locking and unlocking the plumb-bob in the vertical position by remote control so that the grip of the operator's hands supporting the instrument need not be shifted to lock the plumb-bob. It is particularly desirable, when checking angles, such as the climb angle and the glide angle, while flying to be able to lock the plumb-bob in the manner of firing a gun. To this end, a pivot block 18 is fitted in a recess surrounding the needle bore adjacent the eye-bearing end of the needle and supports a pivot pin 19 on which is rockably mounted a push and pull lever 20. One end of the lever engages through the needle eye and the other end has the trigger wire 21 attached thereto. The trigger wire works freely in a guide opening 22 extending through the arm and leading exteriorly of the housing as shown in Fig. 8. At its exposed end, the trigger wire is connected with the trigger 23 which is pivotally mounted in the stock, as shown at 24. When the trigger is pulled, the needle push-and-pull lever 20 is rotated about its pivot so as to draw the head of the needle tightly against the bearing block of the plumb-bob for frictionally binding the latter against the side of the arm 15. The plumb bob is thus locked against any movement. It is a common expedient, in pendulum devices, to brake or bind the pendulum by applying friction to a pivot which is rotatable with the pendulum. In the present invention, a slidable non-rotating pivot is employed and the braking friction is applied to a relatively large surface at the central or hub portion of the pendulum. This relatively large surface provides adequate friction area to insure that the pendulum does not slip or creep after it has been locked in a desired position. The movement of the pivot required for the locking and unlocking of the pendulum is accomplished by remote control, without removing either hand from the instrument, and the locking or unlocking of the pendulum is done substantially simultaneously with the pulling of the trigger. It is necessary, in a "one man" rigging instrument that this locking or unlocking of the pendulum be done without the necessity of the rigger removing either hand from an extremity of the instrument, particularly when the instrument is sighted or pointed after the fashion of a gun or rifle, and it is absolutely imperative in taking "snap" readings during flight that this locking of the pendulum be done instantaneously, otherwise, an incorrect reading may result from shifting the position of the hands or in changing the instrument from one location to another. In order that the rigger may be able to manually control and precisely plumb the bob while in its locked condition, the bearing block 17 carries a tube 25 in the outer end of which is a rubber 26 which projects through a central opening in the transparent plate of the adjacent window to provide a hand-knob for rotating the plumb-bob against the friction that "locks" it. To release the bob, the trigger is pushed forward to reverse the action of the needle which then pushes the bob away from the arm. The friction between the bearing block in the plumb-bob and the needle which supports the block is sufficient for this latter result.

The windows closing opposite sides of the plumb-level chamber are each composed of a scale-ring 27 fitting snugly in the opening and being approximately half the width of the opening; one of the rings having a cut-out to accommodate the arm 15. Each ring has an integral flange 28 at its outer edge seating in the recessed margin of the opening and forming a support for a plate 29 of celluloid or other transparent material held in place by a retaining ring 30. One of the scale-rings is fixedly secured to the stock by the clamping screws 31 of its retaining ring, while the other ring is rotatable through an arc of 360 degrees. The flange, transparent plate and plate-retaining ring of the rotatable scale-ring are secured together by a plurality of rivets 32, the knob-like heads of which provide convenient means for manually rotating the ring. The stock of the instrument is provided, on one side of the rotatable ring, with peripheral ring-guides such as the guide screw 33 and the guide clip 34. Projecting outwardly of the stock on the opposite side of the ring is a threaded binding stud 35 which carries a binding knob 36 for clamping the ring to the stock whereby it can be locked in any position of rotation. On the inside of each scale ring is a protractor scale 37 from which readings are taken by means of the plumb-bob. It will be observed that the invention requires the employment of only two scales; a fixed scale and a rotatable scale, the latter showing by comparison to the fixed scale the amount by which it has been rotated. These scales are in the form of cylinders so that they face the light no matter from which side of the instrument the light is shining. It will be noted, also, that the structure and design of the rotatable scale, as hereinbefore described, is such as to make provision for rotating the rotatable scale speedily from one setting to another and the rotation of the scale is not limited. To expedite the checking of alignment of an airplane, it is advantageous to be able to shift the rotatable scale speedily and the scale should be rotatable through at least 90 degrees.

Another essential feature of the invention is the provision of means for indicating whether or not the pendulum, when at rest, is truly vertical. To this end, the plumb-bob carries a spirit level 38 and has two diametrically opposite indicators 39 and 40 with a black line running from tip to tip of the indicators so that a reading may be taken as readily with the instrument held above the head and viewed from below as with the instrument held low and viewed from above. By providing a spirit glass as part of the pendulum, it is possible to check the coincidence, or the inclination, of the axis of the pendulum to the vertical. By the "axis of the pendulum" is meant the longitudinal axis which passes through the point of support and the center of gravity of the pendulum and terminates at the pointers or indicators and which, in the present invention, is identified on the transparent material of the pendulum by a heavy, opaque, black line, as previously mentioned. There is bound to be some friction in all pendulum devices and as a result the pendulum is just as apt to come to rest out of the vertical as it is to come to rest in a truly vertical position. Since an airplane is such a sprawled-out structure, any local misalignment will be multiplied into the general alignment and, therefore, any instrument of such a length as to be conveniently used for a rigging instrument must be very accurate. To insure that the pendulum is locked in a truly vertical position, means such as the hand knob 26, are provided by which the pendulum if at rest in any other than a truly vertical position can be set or trimmed into proper position manually by the rigger before a reading is taken. In checking the angle of incidence of a wing, the chord of the wing is the basic reference line and the instrument must be held up under the wing on the wing chord. In checking the angle of dihedral of a wing, the wing beam is the basic reference line and the instrument must be laid on top of the wing beam. The angle indicated by the instrument must be easily read under both conditions. The plumb-level is made of transparent materials so that the protractor scale and the black sight-line of the indicators are in bold relief and a reading can be taken from either side of the instrument as well as from above and below. By reason of the two transparent windows, the chamber containing the plumb-level is well lighted from both sides so that the angles indicated by the instrument can be clearly read under the conditions imposed in the use of a rigging instrument. In using a rigging instrument in checking the alignment of an airplane, the operator or rigger is often compelled to read the instrument on its shady side, i. e., with the stock of the instrument so held as to intercept the light. Present available instruments are unsuitable and objectionable in the lack of any provision for lighting the scale on one side of the instrument with the light shining on the other side. In the subject invention, however, provision is made for lighting the scales under such conditions by laying them flat against the wall of a circular opening in the stock in which is housed the pendulum, and the pendulum is made of transparent material so that it will not cast a shadow on the scales. The practical value of any rigging instrument is in direct proportion to the facility and accuracy with which it can be read under the circumstances in which it must be used. For the purpose of obtaining very fine readings, the instrument may be provided with a vernier, as shown at 41. As to the operation and use of the vernier, it of course operates in the same manner as any other vernier, and it is used in this case to register in degrees and minutes of a degree the rotation of the rotatable scale, from a position in which the zero degree and the 180 degree mark on the rotatable scale and the zero minute mark on the vernier all on a perpendicular to the straight edge of the instrument.

In the process of rigging an airplane, some arbitrary definite line in the airplane is selected as the basic reference line for the various measurements. This reference line, which may be the line of the upper longérons of the fuselage or nacelle or the thrust line, is kept horizontal and hence the first operation of rigging an airplane is to level the fuselage laterally and longitudinally. Manufacturers of airplanes usually install leveling brackets on the fuselage to facilitate rigging. The labor and time required for this operation is eliminated by the use of the herein described instrument with which any attitude of an airplane at rest on the ground may be taken as the "level" attitude, thus making it practical to instrument align an airplane without leveling it into flying position.

The manner in which the instrument is used to align an airplane is depicted in Fig. 2, with the exception that the instrument is usually laid on the leveling brackets in the inverted position. To establish the inclination of the longitudinal axis of an airplane to the horizontal, when the tail of the airplane is resting on the ground, the instrument is held in position A with the barrel or straight edge placed on the longitudinal leveling brackets 42 of the airplane and the trigger pulled to lock the plumb-bob, the pointers of which will indicate on the fixed protractor scale the inclination of the longitudinal axis of the airplane. The rotatable protractor scale is now rotated until zero calibrations on the scale coincides with the pointers of the locked plumb-bob and it is then locked in this position by the binding knob 36. In this set position of the rotatable scale the zero calibrations thereof represent the basic reference line in the airplane selected for the various measurements and serve as datum points for checking angles of incidence, dihedral, stagger, etc., as indicated by the pendulum on the rotatable scale. The straight edge of the instrument may now be laid on a wing chord, position B, and the trigger pushed forward to release the plumb-bob which being free to rotate, will seek the vertical and, if locked in this position by again pulling the trigger, will indicate on the rotatable scale the angle of incidence of the wing. Several key positions along the wing span may be compared for similarity of incidenece.

In position C, the instrument is sighted in line with the entering edges of the upper and lower wings. The trigger is first pushed forward to free the plumb-bob and then pulled backward to lock the plumb-level which in its locked position, will indicate on the rotatable scale the angle of stagger or the angle formed by a line tangent to the entering edges of the two wings and the vertical axes. The wing tips may be compared one to the other for equality of stagger and both to the center section stagger. By means of the hand knob 26 and the trigger mechanism, the plumb-level may be set or "trimmed" to any desired degree and then locked so that angles checked at different stations on an element of an airplane may be directly compared to the angle checked at one particular station. In rigging, it is often of less importance to know the exact angle than it is to know whether two or more stations have the same angle.

In Fig. 1 is depicted one instance of using the device for checking angles while flying. If the instrument, in a climb or glide, is kept trained on some object on the ground it will indicate the angle of the flight path of the airplane to the horizontal at the instant the trigger is pulled and the plumb-bob locked. In a steady climb or glide, this will give a very approximate indication of the true or average inclination of the flight path to the horizontal. In determining the inclination of the flight path of the airplane to the horizontal, the straight edge of the instrument is trained on some object on the ground that can be kept in line with such edge and the pendulum is then locked by the trigger control. The tip of the pendulum will indicate on the rotatable scale the inclination of the flight path. Only when the straight edge of the instrument is parallel to the flight path will an object on the ground remain in the line of vision without moving the instrument.

In checking the attitude of balance of an airplane in flight, the instrument is held across the top longérons or is laid transversely on the cabin floor and the inclination of the lateral axis of the airplane to the horizontal in "hands off" flight is determined. The same procedure is followed in determining the angle of pitch in "hands off" flight with the exception that, in this instance, the instrument is placed parallel to the longitudinal axis of the airplane.

Having thus described the invention, what is claimed as new is:

1. A rigging instrument embodying a stock of rifle-like formation having a depending housing forwardly of the shoulder piece and having transparent sides to admit light from either side of the stock, a plumb-bob-protractor unit mounted in said housing, and trigger-operated means for locking the plumb-bob against movement and including a trigger pivotally mounted in the stock and exposed for operation at a point rearwardly of the housing.

2. A rigging instrument having, in combination, a graduated scale, a pendulum support, a slidable non-rotating pivot mounted in said support and headed at its outer end, a pendulum rotatable on said pivot, and trigger-operated means connected with the pivot and operable to slide the same to bind the pendulum frictionally between the support and the headed end of the pivot.

3. A rigging instrument having, in combination, a stock provided with a circular opening, a pair of relatively fixed and rotatable scales within said opening, the rotatable scale reading against the fixed scale, a pendulum between the scales and having index means common to both scales, a support for said pendulum and means for frictionally binding the pendulum against the support including a trigger exposed for operation through the stock at a point remote from the pendulum.

4. A rigging instrument having, in combination, a circular scale, a pivotally supported pendulum of transparent material having its longitudinal axis passing through the point of support and the center of gravity of the pendulum and identified with a black line, said pendulum having an indicator point at one end of the said axis line and a recess disposed transversely of the opposite end of said axis line, and a spirit glass mounted in said recess.

5. A rigging instrument having, in combination, a circular scale, a pivotally supported pendulum of transparent material having its longitudinal axis passing through the point of support and the center of gravity of the pendulum and identified with a black line, said pendulum having an indicator point at one end of the said axis line and a recess disposed transversely of and interrupting the opposite end of said axis line, and a spirit glass mounted in said recess.

6. An instrument comprising a stock having a circular chamber provided with a transparent window on each side of the stock, a pair of protractor scales within the chamber and respectively disposed flat against the wall of the circular chamber and adjacent a window of the latter and a rotatable plumb bob pivotally mounted in said chamber inwardly of the protractor scale so as to be common to both and having diametrical indicators connected by a slight line extending longitudinally of the bob, said plumb bob being of transparent material so that the protractor scale and the sight line are clearly visible through the bob from either side of the instrument.

7. In a rigging instrument, a pendulum support, a pendulum having a pivot engaged in and slidable with respect to the said support for moving the pendulum into and out of frictional contact with the support, the said pendulum swinging freely about its axis when out of contact with the support and being frictionally held against movement when in contact with the support, and means manually operated for sliding the pivot to place the pendulum into and out of frictional contact with said support.

8. In a rigging instrument, a pendulum support, a pendulum having a supporting pivot engaged in and slidable with respect to the said support for moving the pendulum into and out of frictional contact with the support whereby the said pendulum is frictionally held against movement about its axis when in contact with the support but is free to swing when not in contact therewith, said pendulum and support having contact over a large braking area to provide adequate friction to ensure the pendulum does not creep when locked, and means for sliding the pivot to place the pendulum and support into and out of frictional contact with each other.

9. In a rigging instrument, a pendulum support, a slidably non-rotating pivot extending through said support, said pivot having an abutment at one end and an eye on the other end, a pendulum mounted on the pivot between the abutment of the latter and the adjacent side of the support, a push-and-pull lever rockably mounted on the said support and having one end engaged in the eye of the pivot, and means for rocking the lever.

10. In a rigging instrument, a stock provided with a pivot aperture, a circular scale concentric with said aperture, a pendulum reading against the said scale, a pivot for the pendulum on which the pendulum is normally free to rotate, said pivot having a pendulum-abutment and being slidable inwardly of the pivot aperture to frictionally bind the pendulum against movement between the stock and the abutment of the pivot and being slidable outwardly of the aperture to release the pendulum for free swinging movement, means for sliding the pivot to bind and release the pendulum, and a knob on the said pendulum for manually rotating the pendulum relative to the pivot in its locked condition and against the friction that locks it.

11. In a rigging instrument, a stock having a circular opening, a support for a pivot in said opening having a transverse bore concentric with said opening, a headed pivot in said bore and slidable axially thereof, said pivot having its headed portion disposed exteriorly of the bore, a bearing block rotatable on the exteriorly disposed portion of the pivot and between the head of the latter and the adjacent side of the pivot support, a pendulum fixed on the said bearing block and adapted when the pivot is moved inwardly of the bore to contact with the said pivot support, means for sliding the pivot to bind the pendulum against the support, and means for rotating the pendulum against the friction that binds it consisting of a tube fixed to the said bearing block concentric to and projecting beyond the head of the pivot, and a plug fixed in the projecting end of the said tube.

12. An instrument comprising a stock having a circular chamber, an indicator pivotally mount in said chamber to rotate according to the inclination of the stock, a pair of scale rings disposed flat against the wall of the circular chamber and positioned respectively on opposite sides of the indicator, one of said scale rings being fixed relatively to the chamber for giving a reading in conjunction with the indicator of the inclination of the instrument to a selected basic line of reference and the other ring being rotatable for setting its zero calibration in coincidence with the tip of the indicator when the latter is read against the fixed scale, and means for locking the rotatable scale in its zero set position whereby angles measured from the first reading as a base may be read directly from the rotatable scale.

13. A rigging instrument having, in combination, a stock provided with a circular opening constituting a pendulum chamber, a pivotally mounted pendulum in said chamber, and windows closing opposite sides of the chamber, each window being composed of a scale ring disposed flat against the wall of the circular chamber for aproximately half the width of the opening and having a seating flange at the outer edge—a transparent plate supported upon said flange—and a retaining ring securing the plate to the flange, one of said scale rings being rotatable and having its flange, transparent plate, and plate-retaining ring secured together by rivets, the knob like heads of which provide convenient means for manually rotating the ring.

14. A rigging instrument having, in combination, an instrument stock provided with a circular pendulum chamber open at its sides to admit light from either side of the stock, a pendulum in said chamber, a pair of cylindrical scales disposed flat against the wall of the chamber and laterally of each other on opposite sides of the pendulum, each scale having a flange at its outer edge in abutment with the side of the stock, transparent plates covering the open sides of the chamber and having support on the said flanges of the scales, retaining rings for clamping the plates to the supports, clamping fasteners connecting the flange, plate and ring of one scale and penetrating the stock to fixedly secure the scale thereto, the other scale being rotatable, fastening means securing the flange, plate and plate-retaining ring of the rotatable scale and having knob-like heads providing convenient means for manually rotating the ring, and means for clamping the rotatable ring to the stock to hold it in any position of rotation.

15. A rigging instrument for instrument-aligning an airplane without leveling it into flying position which consists of a stock having a straight edge adapted to be initially placed on some part of the airplane known to be parallel to some basic line of reference such as the longitudinal axis of the airplane and to be subsequently aligned with some part of the airplane the angle of which to the longitudinal axis of the airplane it is desired to check, means including a pendulum carried by the stock and indicating in the initial placement of the instrument the inclination of the longitudinal axis of the airplane to the horizontal, means for fixing a datum point to coincide with the indicating means, said datum point fixing means including a calibrated rotatable scale against which the said pendulum is read, and a vernier fixed on said stock in cooperative relation with the said rotatable scale and said pendulum to give a reading in degrees and minutes of a degree of the rotation of the rotatable scale from a position in which the zero degree and 180 degree calibration on the rotatable scale and the minute mark on the vernier all lie on a perpendicular to the straight edge of the instrument.

16. A rigging instrument for instrument-aligning an airplane without leveling it into flying position which consists of a stock having a straight edge adapted to be initially placed on some part of the airplane known to be parallel to some basic line of reference such as the longitudinal axis of the airplane and subsequently held against some part of the airplane the angle of which to the longitudinal axis of the airplane it is desired to check, a pair of relatively fixed and rotatable protractor scales carried by the stock, a pendulum indicator carried by the stock and reading against the fixed scale in the initial placement of the instrument for indicating the inclination of the longitudinal axis of the plane to the horizontal, means operable for rotating the rotatable scale until it reads zero at the tip of the pendulum-indicator, separate means for locking the adjusted scale and the pendulum-indicator respectively in fixed position relatively to the stock, the said pendulum-indicator locking means being operable to release the pendulum-indicator to indicate on the adjusted scale in the subsequent placement of the said instrument the angle so checked.

17. In a rigging instrument, a pendulum, a fixed scale against which the said pendulum reads for indicating the inclination of the instrument to a basic reference line, a pivot pin mounted in the instrument in fixed parallelism to the base of the instrument, and an agate bearing member rotatably supported on said pivot pin and fixedly secured to the said pendulum to provide a support for the latter, said bearing member having a pivot bearing bore considerably larger in diameter than the pivot pin to enable the pendulum to hang vertically even though the base of the instrument and hence the pivot be inclined to the horizontal.

JOHN R. CARROLL.